United States Patent [19]

Spevack

[11] 3,871,833
[45] Mar. 18, 1975

[54] MEANS FOR IMPROVING THERMAL CONTROL IN DUAL TEMPERATURE SYSTEMS

[76] Inventor: Jerome S. Spevack, 160 Pinebrook Dr., New Rochelle, N.Y. 10801

[22] Filed: Feb. 7, 1973

[21] Appl. No.: 330,327

Related U.S. Application Data

[60] Continuation of Ser. No. 43,626, April 30, 1970, abandoned, which is a division of Ser. No. 587,365, Sept. 26, 1966, which is a continuation of Ser. No. 822,973, June 25, 1959, abandoned, which is a division of Ser. No. 188,925, Sept. 29, 1950, Pat. No. 2,895,803.

[52] U.S. Cl....................... 23/260, 423/580, 23/263
[51] Int. Cl................................................. B01j 1/00
[58] Field of Search........................ 23/260; 423/580

[56] References Cited
UNITED STATES PATENTS

| | | | |
|---|---|---|---|
| 2,690,379 | 9/1954 | Urey et al. | 423/580 |
| 2,741,543 | 4/1956 | Urey | 423/580 |
| 2,787,526 | 4/1957 | Spevack | 423/580 |
| 3,142,540 | 7/1964 | Spevack | 23/260 |

*Primary Examiner*—James H. Tayman, Jr.
*Attorney, Agent, or Firm*—Hall & Houghton

[57] ABSTRACT

A cooperating assembly for increasing thermal efficiency in an apparatus for processing carrier and carried fluid materials capable of existing in liquid and gaseous phases, the apparatus being of the type which comprises a. first means for heating from a first temperature to a second temperature one of said phases consisting of a flow of carrier material containing at said first temperature a content of carried material in solution, b. a second means for further heating to and processing said flow at a third temperature higher than said second temperature, c. a third means, for cooling the processed flow from the second means, and d. heat transfer means inter-connecting said first and third means and comprising an indirect contact heat transfer surface for transferring heat from said third means to said first means, in which assembly e. the first means comprises means for providing both liquid and gaseous phases containing said carrier and carried materials in a direct contact with each other;

whereby the flow in the first means is enabled to recover from the flow in the third means all of the heat required for both heating said flow in said first means and for adjusting the content of carried material contained in the carrier material at said second temperature, thus correspondingly reducing the amount of further heating which would otherwise be required to attain said third temperature in said second means.

10 Claims, 7 Drawing Figures

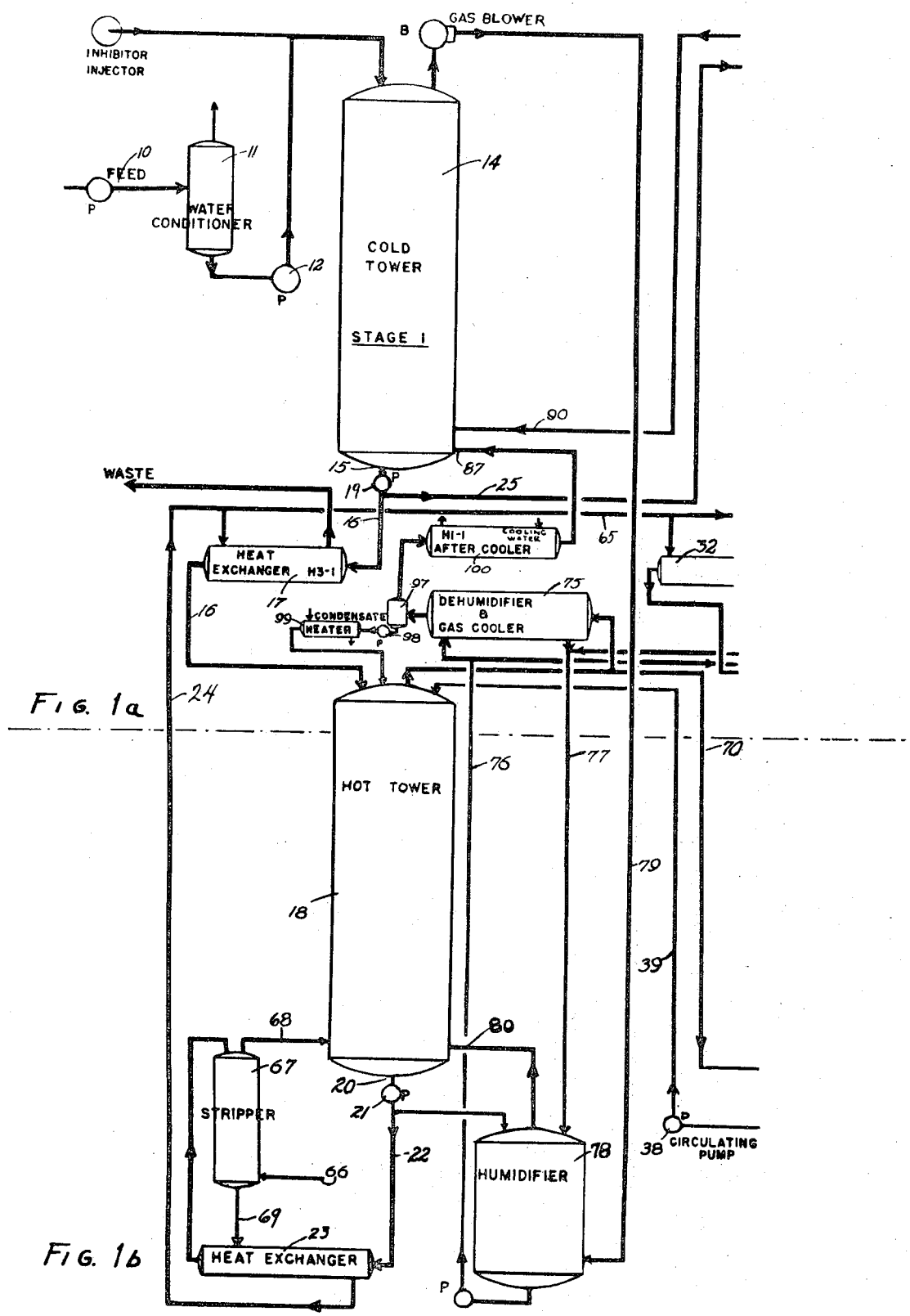

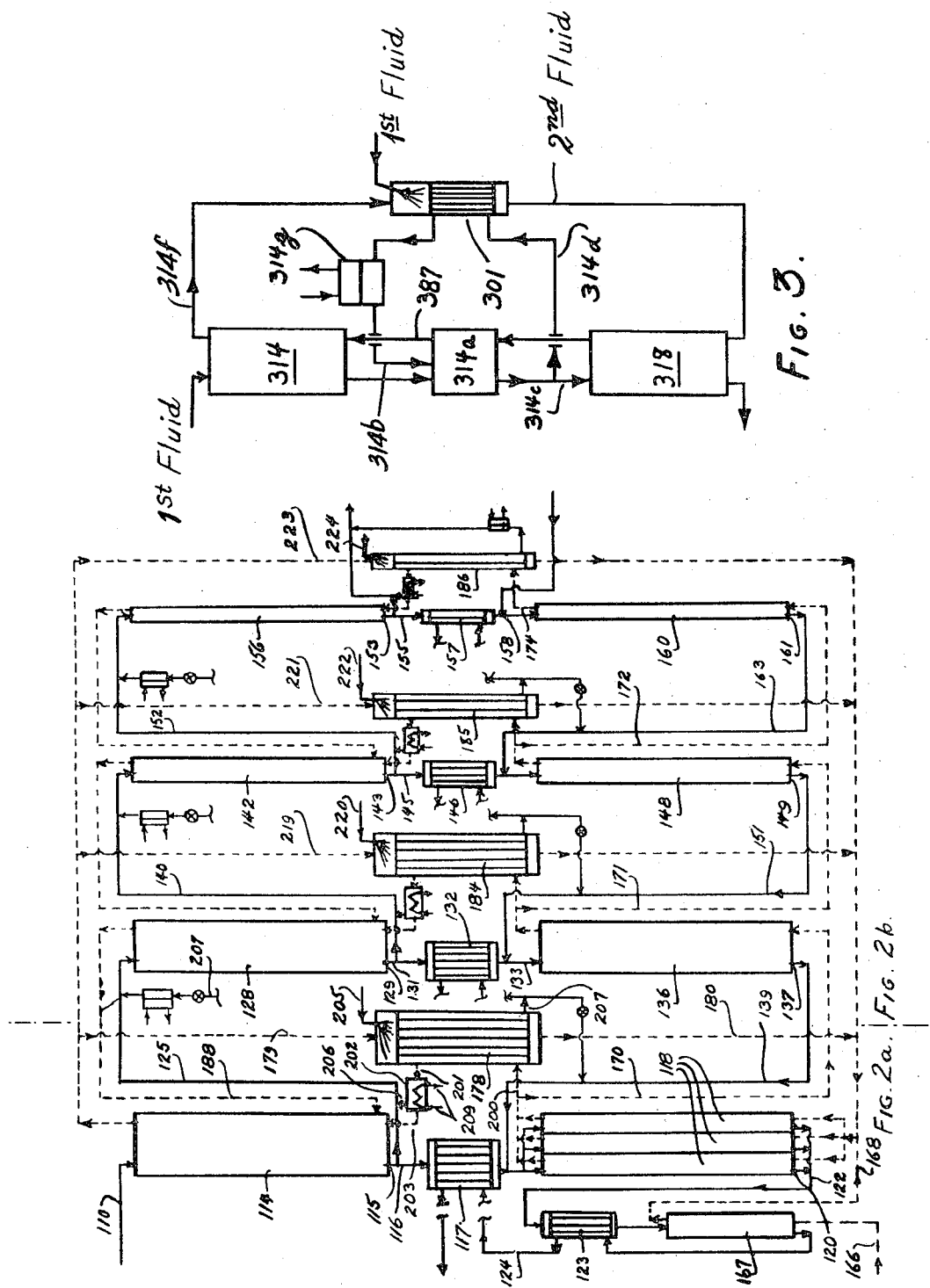

MEANS FOR IMPROVING THERMAL CONTROL IN DUAL TEMPERATURE SYSTEMS

This is a continuation of application Ser. No. 43,626 and now abandoned, filed Apr. 30, 1970 as a division of application Ser. No. 587,365 filed Sept. 26, 1966, pursuant to a requirement for restriction therein. Said application Ser. No. 587,365 (now replaced by application Ser. No. 214,494 filed Dec. 30, 1971) was a continuation of application Ser. No. 822,973 (now abandoned) which was filed June 25, 1959 as a division of my copending parent application Ser. No. 188,925 filed Sept. 29, 1950 (now U.S. Pat. No. 2,895,803 issued July 21, 1959).

The described invention which is claimed herein relates to improvements in methods and apparatus for the control of temperature, saturation and solubility in systems in which both liquid and gas are present together, at different temperatures in different locations in the system. In such systems, for instance, as disclosed in U.S. Pat. No. 2,787,526, issued Apr. 2, 1957, a single stage system of each stage of a cascade employs a cold tower and a hot tower and the progress of the exchange reactions through the system has required alternate and repeated cooling and heating of the substances involved in a very costly manner. These temperature reversals taken with the humidity variations and loss of costly materials with the waste have constituted the outstanding factors in the operating costs and have been determinative of the practicability of the system.

An object of this invention is to provide improved systems for reducing such cost factors in a manner economizing on the energy to be supplied and greatly reducing the cost of operation while at the same time maintaining the rate and quality of output.

Further objects of the invention will appear from the following specification taken in connection with the accompanying drawings in which:

FIGS. 1a, 1b, 1c, and 1d show connected parts of a flow diagram illustrating preferred embodiments of the present invention associated in a cascade embodiment of a system of the class described;

FIGS. 2a and 2b show a similar flow sheet illustrating a modified form of temperature and humidity adjusting system of this invention;

FIG. 3 shows a similar flow sheet of a further modification of the temperature and humidity adjusting system.

Figures 1C, 1D:
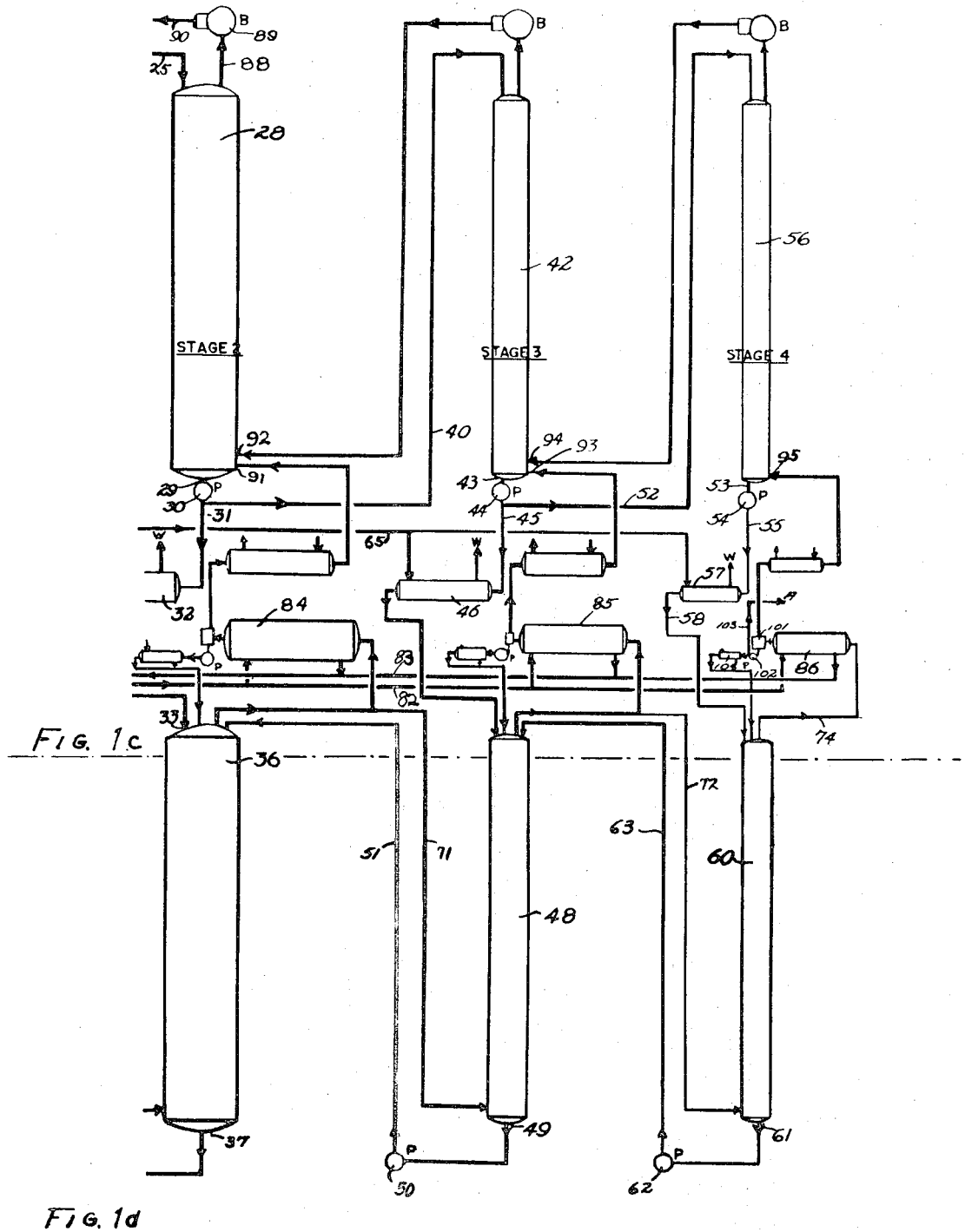

The features of the present invention are typically illustrated in connection with the concentration of deuterium by countercurrent reactions at contrasting high and low temperatures. Where the reactants for this purpose are hydrogen sulfide gas ($H_2S$) and liquid water ($H_2O$), the reactions are ionic as explained in my aforesaid parent application and equilibrium conditions favor concentration of the deuterium in the water phase with a greater concentration effect occurring at the lower temperature. Proper operation of the process gives rise to a concentration gradient in the towers and causes an accumulation of deuterium as heavy water at the bottom of the cold tower. In the systems shown, hydrogen sulfide gas is continuously recycled from the top of the cold tower to the bottom of the hot tower, always flowing countercurrent to the water.

The supply of liquid, e.g., water, (FIG. 1a) enters at 10 and passes through water conditioner 11 and pump 12 to the top of the cold tower 14 of the first stage. As hereinafter explained, there is a countercurrent of gas ($H_2S$) passing upward in this tower 14, the temperature of this cold exchange reactor being maintained at about 20°C., for instance, for a pressure of 5 atmospheres.

The cold liquid discharged at 15 at the bottom of the tower by pump 19 is divided, one portion going by conduit 16 through heat exchanger 17 to be heated thereby and passed on to the top of the hot tower 18 of this first stage. Here again there is a countercurrent of gas for the hot (80°C.) exchange reaction and the hot liquid discharged at 20 at the bottom of the tower is passed by pump 21 and conduit 22 through stripper 67 and heat exchanger 23 removing dissolved gas ($H_2S$) from the liquor and raising the temperature of the liquor which then passes through conduit 24 to heat exchanger 17 where it serves to raise the temperature of the first stage liquid passing from the cold to the hot tower. The discharge of this circulation of heating liquid from exchanger 17 passes to waste.

The other portion of the cold liquid discharged from the cold tower at 15 passes by conduit 25 to subsequent operations, from which hot liquid may be received through pipe 39 to the top of the hot tower 18. Thus in the form shown in FIGS. 1a–1d the liquid from conduit 25 passes to the top of the cold tower 28 of the second stage for the cold (20°C.) reaction with the upward sweeping countercurrent of gas and the cold liquid discharged at 29 passes through pump 30 and in part through pipe 31 and heat exchanger 32 raising the temperature of the liquid for entry at 33 into the hot tower 36 where it meets the countercurrent of gas, this hot reaction being at about 80°C. and discharging the hot liquid at 37 to pump 38 passing the liquid through pipe 39 to the top of the hot tower 18. The remainder of the cold discharge from tower 28 passes by piping 40 to the top of the cold tower 42 of the third stage where it is reacted by the countercurrent gas and discharged at 43 to be passed by pump 44 and by piping 45 to heat exchanger 46 raising its temperature for discharge through piping 47 to the top of the hot (80°C.) tower 48 and is subjected to reaction with the countercurrent gas and discharge at 49 through pump 50 passing the hot liquid through piping 51 to the top of the next preceding hot tower 36. The other part of the cold discharge from tower 42 passes by pipe 52 to the top of the fourth stage cold tower 56 at 20°C. where it reacts with the countercurrent gas and is discharged at 53 through pump 54 and piping 55 to heat exchanger 57 and piping 58 to the hot tower 60. The discharge of hot liquid from this tower at 61 is passed by pump 62 and piping 63 to the top of the hot tower 48 of the preceding stage, completing the circuit of the liquid within the system unless additional stages are found advantageous.

No temperature treatment is required for the liquid flows to the cold towers assuming an initial supply at the right temperature. The liquids supplied to the hot towers are raised in temperature by the heated waste discharge. In the form shown this waste discharge flows from the primary hot tower 18, and waste pipe 24 is connected to feed pipe 65 leading to the heat exchangers 32, 46 and 57 of the second, third and fourth stages respectively. The temperature regulation of the liquid is thus provided from sources within the system and additional steam is only drawn upon in connection with the final stripping of the discharge liquor at 67 and return of the separated gas to the hot tower 18.

This stripping is another feature of the improved process whereby dissolved gas (H₂S) is removed from the waste liquor. This is accomplished in a simple but effective way at essentially no extra energy expense. The amount of steam that is still required to make up for process inefficiencies and to complete the gas heating and humidification as hereinafter explained, is put to an additional use before it enters the hot tower 18. This steam entering at 66 is passed countercurrent to the processed waste liquor in the contact stripping tower 67. In this manner the dissolved hydrogen sulphide is removed from the waste liquor and swept back through outlet pipe 68 to the hot tower 18 together with the steam. Stripping efficiency which leaves less than one part per million residue may be attained. The hot liquid discharge at 69 from stripper 67 is circulated in heat exchanger 23 to increase the temperature of the waste liquor supply prior to its employment for heating fluid flowing from a cold tower to a hot tower. In the form shown the augmented temperature waste liquid from 23 is applied to heat a plurality of liquid streams flowing from cold towers to hot towers, by delivering it to the subsequent heaters 17, 32, 46 and 57 for the liquid entering the hot towers, the liquid being raised, for instance, from 80°C. in conduit 22 to 85°C. in conduit 24.

In other words, this stripping arrangement constitutes a cooperating assembly for increasing thermal efficiency in an apparatus for processing carrier and carried fluid materials capable of existing in liquid and gaseous phases (e.g., water and H₂S), the apparatus being of the type which comprises a. first means, viz: the fluid heating side of 23, for heating from a first temperature, that in 22, to a second temperature, that in the conduit leading from 23 to 67, one of said phases consisting of a flow of carrier material (liquid water) containing at said first temperature, i.e., the temperature in 22, a content of carried material (H₂S) in solution, b. a second means (67) for further heating to and processing, i.e., stripping, said flow (from 22–23) at a third temperature (in 67) higher than said second temperature i.e., the temperature of the flow in the conduit leading from 23 to 67, this second means 67 having an inlet end (at the top) with an inlet thereto connected to the outlet from said first means 23 (the connection from 23 leading to the top of 67) for receiving said flow therefrom (from 23) and an outlet end (at the bottom of 67), with an outlet (69) therefrom.

c. a third means, viz: the fluid cooling side of 23, for cooling the processed flow from the second means 67, said third means having an inlet thereto, at the bottom end of 67, connected to said outlet 69 for receiving the processed, i.e., stripped, flow therefrom and having an outlet therefrom to conduit 24, and d. heat transfer means inter-connecting said first and third means (the fluid heating and fluid cooling sides of 23) and comprising an indirect contact heat transfer surface, i.e. that of the heat exchanger 23, for transferring heat from said third means to said first means, in which assembly e. the first means (fluid heating side of 23) comprises means for providing both liquid and gaseous phases containing said materials in a direct contact with each other, by heating to the second temperature the liquid from 22 which is saturated with carried fluid (H₂S) at the first temperature and thus effecting in the fluid heating side of 23 a change of phase of carried material (dissolved H₂S) from liquid to gaseous phase as the content of carried material (H₂S) dissolved in the flow of carrier material (liquid water) adjusts to correspond essentially to saturation at said second temperature (in the conduit leading from 23 to 67).

Thus by this cooperative assembly the flow in the first means (fluid heating side of 23) is enabled to recover from the flow in the third means (the fluid cooling side of 23) all of the heat required for both heating said flow in said first means and for adjusting the content of carried material (H₂S) contained in the carrier material (liquid water) at said second temperature, and this correspondingly reduces the amount of further heating in 67 which would otherwise be required to attain said third temperature in said second means 67.

The just mentioned reduced amount of further heating in 67, in the form shown, is effected with the aid of a supply means (steam pipe 66 connected to said second means 67 at the bottom or outlet end thereof with respect to the flow in 69) for introducing into direct contact with the materials in 67 a further flow comprising said water in gaseous phase and, in said form, the stripper 67 also comprises second outlet means 68 at the upper end thereof, i.e., the inlet end thereof with respect to the flow from 23.

The conditioning of the countercurrent gas (for instance (H₂S) is attained with utmost economy. The gas supplied to the cold tower 14, and in the cascade form shown to the cold towers 28, 42 and 56, is efficiently cooled and dehumidified and the gas supply to the hot tower 18 is heated and humidified with interchange of energy between these operations. In the multi-stage form shown, the hot towers of the remaining stages receive their supplies from the hot towers of the previous stages, so that all treatment of the gas supplies to the second, third and fourth stage hot towers is dispensed with. This novel multi-stage arrangement, which is claimed in my copending applications, results in a type of cascade system which integrates the plant so that each stage is not an independent unit but is a working part of the overall system. The hot humidified gases required at the bottom of the second stage hot tower 36 are obtained through piping 70 from the hot gases leaving the hot tower 18 of the first stage, and all of the hot liquor from the hot tower 36 of the second stage returns by piping 39 to the hot tower 18 of the first stage. Similarly hot tower 48 receives its gas supply from preceding hot tower 36 by piping 71 and returns to tower 36 its hot liquor discharge by piping 51, while hot tower 60 receives its hot gas through pipe 72 from the preceding hot tower 48 and returns to tower 48 its hot liquid discharge through pipe 63. In said multi-stage arrangement, the final discharge of hot gases from fourth stage hot tower 60 pass out through piping 74 to subsequent conditioning treatment and is then used to supply the countercurrent gas to cold tower 56 of the fourth stage.

An important aspect of the present system is the recovery and use of the low level energy which is available in the cooling and dehumidification of hot humidified gases. Instead of cooling these hot gases with cooling water and wasting the heated water, by the present invention the latter is circulated in a cyclic treatment reclaiming the heat and using it for heating and humidification of gases entering a hot tower.

In the system shown the hot gases from the tower 18 must be cooled and dehumidified before they can be used in the cold tower 14, and in the multi-stage arrangement shown the same problem is presented at each following stage. In accordance with this invention, a supply of these hot gases from tower 18 on their way to the cold tower 14 are passed through the dehumidifier and gas cooler 75 which is cooled by water supplied by pipe 76. This water raised in temperature is fed by pipe 77 to the top of a special humidifier tower 78 and through this tower 78 the cold gases brought by pipe 79 from cold tower 14 are passed in direct contact countercurrent to the hot water. By this efficient direct contact method the cold gases are simultaneously heated and humidified while the circulating liquor is cooled. The hot humidified gases are passed by pipe 80 into the hot tower 18. The cooled liquor is recirculated to the dehumidifier and cooler 75 to pick up another charge of energy for delivery to the humidifier 78. Thus, the recirculated liquid circulates in a closed cycle 75, 77, 78, 76. In the system shown, in which the recirculated liquid comprises water, a small amount of make-up water is continuously added to this liquor cycle in order to replace that portion which is consumed in humidification of the gas stream. This may conveniently be drawn from the discharge pipe 22 from hot tower 18 or from the food, etc.

A further advantage of the embodiment shown in FIGS. 1a–1d is that all of the energy from the dehumidifiers of all of the stages is available for humidification and gas heating in the humidifier 78 of the first stage. These stages, two, three and four, receive their hot gases direct from the preceding stage in each case and so humidifiers for these stages are dispensed with. In each of these stages the corresponding dehumidifier and cooler 84, 85, 86 intervening in the gas passage between the hot tower and the cold tower is cooled by circulation from pipe 82, drawing its supply from pipe 76, and pipe 83 returning the discharges to pipe 77 so that these dehumidifiers 84, 85, 86 of these subsequent stages are in circuit with the cyclic circulation through humidifier 78 and supply energy thereto.

In the cascade system shown, the cooled gases from hot tower 18 pass into the bottom of cold tower 14 at 87 and are joined there by the cold gases brought from the cold tower 28 by pipe 88, gas pump 89 and pipe 90. Similarly the cold tower 28 is supplied at 91 with cooled gases from hot tower 36 and at 92 with cold gases from tower 42, while tower 42 receives cooled gases at 93 from hot tower 48 and at 94 is supplied with cold gases from cold tower 56, which latter tower receives its supply of gases at 95 solely from hot tower 60.

In addition to the dehumidifying and cooling of the hot gases at 75, 84, 85, 86, they may be subjected to a separating action as in separator 97 of stage one receiving the discharge from cooler 75 and separating out the liquid. In the system shown, the separated liquid from 97 is passed by pump 98 to heater 99 and delivered into the top of the hot tower 18. The energy for heater 99 is supplied from an outside source. The gas discharge from separator 97 is further cooled in aftercooler 100 supplied with cooling circulation from any suitable source and the condensate from this aftercooler is carried into tower 14 with the gas stream. Similar condensers and coolers may be provided at the subsequent stages as shown.

In other words, this heat recovery arrangement constitutes a cooperating assembly for increasing thermal efficiency in an apparatus for processing carrier and carried fluid materials capable of existing in liquid and gaseous phases, (e.g., water and $H_2S$), the apparatus being of the type which comprises:

a. first means; viz: the fluid heating side of 78, for heating from a first temperature, that in 79, to a second temperature (that in conduit 80), one of said phases consisting of a flow of carrier material ($H_2S$ gas) containing at said first temperature, i.e., the temperature in 79, a content of carried material (water in vapor form);

b. a second means 18 for further heating to and processing said flow (from 79–78–80) at a third tmperature (in 18) higher than said second temperature (in conduit 80), this second means 18 having an inlet end (at its bottom) with an inlet thereto connected to the outlet from said first means 78 (the connection 80) for receiving said flow therefrom (from 78), and an outlet end, at the top of 18, with an outlet therefrom (the outlet leading from the top of 18 to 75), c. a third means, viz: the fluid cooling side of heat exchanger 75, for cooling the processed flow from the second means 18, said third means 75 having an inlet thereto connected to the outlet at the top of 18 for receiving the processed flow therefrom, and having an outlet therefrom to 97, and d. heat transfer means interconnecting said first and third means (the fluid heating side of heat exchanger 75 and elements 77, 78 and 76) and comprising an indirect contact heat transfer surface, i.e., that of the heat exchanger 75, for transferring heat from said third means (fluid cooling side of 75) to said first means 78, in which assembly e. the first means 78 comprises means (shown as 77 and/or the conduit from 22 to 78 with 76, and 79 with 80; with the means 77, 76, providing a circulation of the liquid between the liquid side of heat exchanger 75 and 78) for providing both liquid and gaseous phases containing said materials in a direct contact with each other in 78, with heating to the second temperature, i.e., that of 80, of the gas ($H_2S$) from 79 which is saturated with carried fluid (water in vapor form) at the first temperature and thus effecting in 78 change of phase of carried material by vaporization from liquid to gaseous phase in 78 as the content of carried material (water in vapor form) in the flow 79–75–80 of carrier material ($H_2S$ gas) adjusts to correspond essentially to saturation at said second temperature, namely, that in the conduit 80 leading from 78.

Thus by this cooperative assembly the flow in the first means 78 is enabled to recover from the flow in said third means (the fluid cooling side of 75) all of the heat required for both heating said flow in said first means 78 and for adjusting the content of carried material (water in vapor phase) contained in the carrier material ($H_2S$ gas) at said second temperature; and this correspondingly reduces the amount of further heating in 18 which would otherwise be required to attain said third temperature in said second means 18.

The just mentioned reduced amount of further heating in 18, in the form shown is effected with the aid of a supply means 68 shown connected to said second means 18 at the bottom end thereof for introducing a further flow comprising water in gaseous phase (steam) into direct contact with the materials in 18, i.e., the two flows, one in liquid phase (water containing dissolved $H_2S$) and the other in gaseous phase ($H_2S$ containing water vapor). In the form shown in FIGS. 1a–1b the second means 18 also comprises second inlet means (i.e., 16 and/or the conduit from 99 to 18) and second outlet means (20–21) for delivering to and withdrawing from the means 18 a flow of the liquid phase (water carrying dissolved $H_2S$), these second inlet and outlet means being connected to the outlet and inlet ends (with respect to the gas flow) shown at the top and bottom ends of 18, respectively, so that the flow of liquid passes countercurrent to the flow of gas therein. In this form, the supply means 68 is connected to said second means 18 at said inlet end (with respect to gas flow) for effecting said introduction, and comprises means 22, 23, 67, 69, 24 and 66 connected to said second outlet means 20–21 for separating from the liquid in 23, 67, as gaseous phase, essentially all of the content of dissolved $H_2S$ contained therein and returning to 18, via 68 together with the flow of water in gaseous phase, the so separated content of dissolved $H_2S$ at a fourth temperature, i.e., that in 68, which is higher than that in 18.

In the final stage of the cascade system of FIGS. 1a–1d the separator 101 separates out the liquid content of the gases from condenser 86 and pump 102 delivers the condensate to discharge pipe 103 and heater 104 from which the liquid raised in temperature is returned to the hot tower 60.

In this form the gas is an exchange medium and is recycled without being consumed. Make-up gas in small amounts may be supplied preferably at the entrance to the cold tower of the first stage.

The diagrammatic showing and descriptions herein are merely illustrative and descriptive of the invention, and changes in number of stages, temperature of operation, pressure of operation, the kinds of substances used, and other details may be resorted to within the principle of the invention.

The modified cascade system to which the invention is applied in FIGS. 2a and 2b is shown with four stages the first of which has the hot reaction divided between three parallel hot towers 118. In general the handling of the flows and the connections of the reactors and stages are similar and the parts in FIGS. 2a and 2b are in most instances numbered one hundred above the numbers applied to the corresponding parts in FIGS. 1a to 1d. For simplicity the pumps have been omitted from FIGS. 2a and 2b and the liquid stream is in full lines and the gas stream in broken lines. The heat recovery arrangement associated with the towers of FIGS. 2a and 2b is modified and does not employ the closed circuit fluid circulation typified by 75, 76, 77, 78 of the system of FIGS. 1a to 1d. Instead a supply of the hot gases from towers 118 on their way to the cold tower 114 are passed by conduit 200 to heat exchanger 178 and are cooled and have their moisture in part condensed by the countercurrent of a flow of the cold gases from tower 114 by pipe 179. The partially cooled gas from exchanger 178 is passed by pipe 201 to the secondary cooler and condenser 202 and thence by pipe 203 to the cold tower 114. The cooling circulation indicated at 209 for cooler-condenser 202 is supplied from an outside source.

In this system of FIGS. 2a and 2b the heat exchanger 178 raises the temperature of the cool gases received from cold tower 114 and at the same time provides heat for vaporization of the moisture for humidification, the make-up water for humidification being fed in at 205 at the entrance to the heat exchanger. Condensate from exchangers 178 and 202 are collected and delivered through pipes 206, 207 respectively wholly or in part to the top of the cold tower of the next succeeding stage.

In a similar manner a supply of the hot gases from towers 136, 148 and 160 on their way to the cold towers 128, 142 and 156 respectively are passed to heat exchangers 184, 185 and 186 respectively and are cooled and have their moisture in part condensed by the countercurrent of a supply of cold gases from tower 114 by pipes 219, 221 and 223 respectively. The said supplies of gases from tower 114 are raised in temperature in heat exchangers 184, 185 and 186 and at the same time heat is provided for vaporization of moisture for humidification, this make-up water for humidification being fed in at 220, 222 and 224 respectively.

In any system of heat recovery between fluids entering and leaving a hot reactor, there may be direct physical contact only between the fluids entering and leaving, respectively, a single end of the reactor. This limitation is necessary to avoid co-mingling of processed material with unprocessed material. Accordingly, the system described herein has made use of the very efficient direct intimate contact methods of heat transfer together with the indirect non-contacting methods as required for the systems to which the invention is illustratively applied herein. For example, in FIGS. 1a to 1d the energy available from the gas leaving the hot tower is transferred by indirect contact heat exchanger (75, FIG. 1a) 84, 85, 86, FIG. 1c) to water which in turn transfers the energy by direct contact (intimate mixing in a countercurrent tower 78, FIG. 1b) with the gas entering the bottom of the hot tower. In this way it is possible to simultaneously heat and humidify the gas entering the hot tower. Likewise in FIGS. 2a and 2b, in exchanges 178, 184, 185 and 186 there is a simultaneous heating of the gas and vaporizing of the water required for humidification.

Another modified system may be employed in which the heat exchanges between the hot and cold flows are in general the reverse of those employed in FIGS. 1a and 1b. This modification makes use of a heat transfer cycle involving the pick-up of energy from a hot humidified gas by a liquid stream in a countercurrent direct contact, gas cooler dehumidifier tower and the subsequent liberation of this energy from the liquid to a cold gas stream by indirect contact in a countercurrent heat exchanger.

In this modification (FIG. 3) the cold tower 314 may be extended to include a section 314a at its bottom (or a separate tower) which will serve as the direct contact gas cooler-dehumidifier. The cold liquid from the bottom of the cold tower 314 together with an auxiliary flow via 314b passes countercurrent in 314a in contact with the hot humidified gas from the top of the hot tower 318 and becomes heated as the gas is cooled to the cold tower temperature. The cooled gas via 387 then flows upward through the cold tower 314. The hot liquid from the bottom of said direct contacting section 314a is divided. A portion 314a represented by the main cold tower stream plus the added condensate is sent to the hot tower and the balance 314d is sent to a heat exchanger 301 through which indirectly it transfers its energy to a mixture of the cold tower gas and a volume of liquid required for humidification, and thus the cold tower gas outflow 314f is simultaneously heated and humidified as the liquid in 314d is cooled. To make up for inefficiencies of the heat transfer equipment this liquid is further cooled in 314g, as required, before returning it to the same direct contacting section 314a via 314b.

The present invention thus affords systems for adjusting the temperature and saturation of a fluid and for reusing the heat therefrom in unique and advantageous manners.

From the illustrative embodiments of the invention above set forth it will be apparent to those skilled in the art that the present invention provides for the exchange of energy, in the course of the supply of heat to or extraction of heat from a saturable fluid and simultaneous desaturation or saturation thereof with saturating fluid, by a system in which at least one indirect contact heat transfer is employed, and in which, when supply and extraction of heat takes place at different locations, the system may advantageously include the employment of recirculating transfer liquid operating in direct contact with the saturable fluid at least at one of said locations and in series with said indirect heat transfer.

While there have been described herein what are at present considered preferred embodiments of the invention, modifications and changes and rearrangements may be made therein without departing from the essence of the invention; the exemplary embodiments are to be taken as illustrative and not restrictive of the invention, the scope of which is defined in the appended claims; and all modifications that come within the meaning and range of equivalency of the claims are intended to be included therein.

I claim:

1. A cooperating assembly for increasing thermal efficiency in a gas and liquid processing apparatus of the type which comprises:
    a. a first means for heating from a first temperature to a second temperature a flow of gas, to be subsequently processed at a third temperature higher than said second temperature in contact with a vaporizable liquid, said first means having an inlet thereto and an outlet therefrom for said flow,
    b. a second means, for further heating to and processing said flow of gas at said third temperature in contact with the vaporizable liquid, said second means having a vaporizable liquid supply thereto, a gas inlet end with a gas inlet thereto and a gas outlet end with a gas outlet therefrom and having its gas inlet connected to the outlet from said first means to receive said flow therefrom,
    c. a third means, for cooling said processed flow and condensing vapors of said liquid therefrom, said third means having an inlet thereto connected to the gas outlet of said second means for receiving the processed flow therefrom and having gas and liquid outlet means for discharging flows of the cooled gas and liquid condensate therefrom, and
    d. heat transfer means interconnecting said first and third means and comprising an indirect contact heat exchanger for transferring heat from said third means to said first means, in which assembly
    e. said first means further comprises liquid inlet means for providing a quantity of the vaporizable liquid in contact with the flow of gas being heated therein, for effecting in said first means vaporization of said liquid and saturation of said gas with vapor of the liquid in contact therewith by heat transferred to said first means by said heat transfer means, whereby the flow in said first means is enabled to recover from the flow in said third means all of the heat required for both heating said flow of gas in said first means and saturating the same with vapors of said liquid at said second temperature, thus correspondingly reducing the amount of further heating which would otherwise be required to attain said higher temperature in said second means.

2. A cooperating assembly as claimed in claim 1, wherein said heat transfer means also comprises
    f. liquid circulating means connected between one side of said indirect contact heat exchanger and one of said first and third means for providing a circulation of the vaporizable liquid through said side and in a direct contact with the gas and liquid in said one of said first and third means.

3. A cooperating assembly as claimed in claim 2, wherein said liquid circulating means is connected between said one side of said indirect contact heat exchanger and said first means for providing said circulation of liquid in a direct contact with the gas and liquid in said first means.

4. A cooperating assembly as claimed in claim 2, wherein said liquid circulating means is connected between said one side of said indirect contact heat exchanger and said third means for providing said circulation of liquid in a direct contact with the gas and liquid in said third means.

5. A cooperating assembly as claimed in claim 1, further comprising
    f. vapor supply means connected to the gas inlet end of said second means for delivering thereto vapors of said liquid at a temperature greater than said first temperature,
    g. liquid inlet and outlet means, connected to thee gas outlet and gas inlet ends respectively of said second means, for passing a flow of said liquid in counter-current direct contact with the flow of gas in said second means and delivering said flow of liquid from said second means separate from the flow of gas therein,
    h. a stripping means for effecting dissolution and separation of gas dissolved in said flow of liquid delivered from said second means, said stripping means having a liquid inlet end and a liquid outlet end,
    i. an indirect contact heat exchanger means having two sides with each side thereof having inlet and outlet connections,
    j. delivering means, connected to the liquid outlet means of said second means and to the inlet connection of one side of said indirect contact heat exchange means and thence connected from the outlet connection of said side to the liquid inlet end of said stripping means, for delivering through said heat exchange means and to said stripping means the said flow of liquid delivered from said second means, k. means, connected to the liquid outlet end of said stripping means for delivering thereto into countercurrent direct contact with the flow of liquid therein a flow of vapors of said liquid, for effecting in said stripping means further heating of the flow of liquid therein and stripping of dissolved gas from said liquid, l. means, connected from the liquid inlet end of said stripping means to said vapor supply means for delivering to said second means from said stripping means at said greater temperature, together with the uncondensed portions of said flow of vapors of said liquid, gas stripped from the flow of liquid in said stripping means, and m. further delivery means, connected to the liquid outlet end of said stripping means and to the inlet connection of the other side of said indirect contact heat exchange means, for delivering through said other side and the outlet connection thereof the further heated flow of liquid from said stripping means, with the flow delivered from said outlet connection at a temperature less than said second temperature but higher than said first temperature.

6. A cooperating assembly as claimed in claim 5, further comprising n. a second indirect contact heat exchange device having liquid heating and liquid cooling sides, o. said exchange device having means connected through its liquid heating side from a source of liquid cooler than said first temperature and to the liquid inlet means referred to in clause (g) and p. said exchange device having further means connected from the outlet connection referred to in clause (m) and through its liquid cooling side, for effecting heating to said first temperature of the liquid passing from said source of cooler liquid to the liquid inlet means referred to in clause (g).

7. A cooperating assembly as claimed in claim 5, wherein said heat transfer means (d) also comprises n. liquid circulating means, connected between one side of said indirect contact heat exchanger and one of said first and third means, for providing a circulation of the vaporizable liquid through said side and in a direct contact with the gas and liquid in said one of said first and third means.

8. A cooperating assembly for increasing thermal efficiency in an apparatus for processing carrier and carried fluid materials capable of existing in liquid and gaseous phases, said assembly comprising:

a. first means for heating from a first temperature to a second temperature one of said phases consisting of a flow of carrier material containing at said first temperature a content of carried material, said first means having an inlet thereto and an outlet therefrom for said flow, and b. a second means, for further heating to and processing said flow at a third temperature higher than said second temperature, said second means having an inlet end, with an inlet thereto connected to the outlet from said first means for receiving said flow therefrom, and an outlet end with an outlet therefrom for said flow, c. a third means, for cooling the processed flow from said second means, said third means having an inlet thereto connected to said outlet from said second means for receiving the processed flow therefrom and having an outlet therefrom, and d. heat transfer means inter-connecting said first and third means, and comprising an indirect contact heat transfer surface, for transferring heat from said third means to said first means, in which assembly, e. said first means comprises means for providing therein both liquid and gaseous phases containing said materials in direct contact with each other, for effecting in said first means, by heat transferred thereto by said heat transfer means, a change of phase of carried material from liquid to gaseous phase with adjustment of the content of carried material in the flow of carrier material to correspond essentially to saturation at said second temperature, whereby the flow in said first means is enabled to recover from the flow in said third means all of the heat required for both heating said flow in said first means and adjusting the content of carried material contained in the carrier material therein at said second temperature, thus correspondingly reducing the amount of further heating which would otherwise be required to attain said third temperature in said second means.

9. A cooperating assembly as claimed in claim 8, wherein in said second means one of said materials exists in liquid phase containing a content of the other of said materials dissolved therein and the other of said materials exists in gaseous phase containing a content of said one material therein, and wherein in said first means said carrier material is the said one material in liquid phase and said carried material is the content of said other material dissolved therein, said cooperating assembly further comprising:

f. supply means connected to said second means for introducing into direct contact with the materials therein a further flow comprising said one material in gaseous phase, g. said supply means being connected to said second means at said outlet end thereof, and h. said second means comprising second outlet means at said inlet end thereof for withdrawing therefrom carried material in gaseous phase.

10. A cooperating assembly as claimed in claim 8, wherein in said second means one of said materials exists in liquid phase containing a content of the other of said materials dissolved therein and the other of said materials exists in gaseous phase containing a content of said one material therein, and wherein in said first means said carrier material is the said other material in gaseous phase and said carried material is the content of said one material contained therein, said cooperating assembly further comprising f. supply means connected to said second means for introducing into direct contact with the materials therein a further flow comprising said one material in gaseous phase, g. said second means comprising second inlet and second outlet means respectively connected to said outlet and inlet ends of said second means for delivering thereto and withdrawing therefrom a flow of said one material in liquid phase containing a content of said other material dissolved therein, and h. said supply means being connected to said second means at said inlet end thereof, for effecting said introduction and comprising means connected to said second outlet means for receiving the said flow of liquid phase withdrawn therefrom and for separating therefrom as gaseous phase substantially all of the said content of said other material contained therein and returning to said second means, together with said one material in gaseous phase, the so separated content of said other material in gaseous phase, at a fourth temperature higher than said third temperature.

* * * * *

UNITED STATES PATENT AND TRADEMARK OFFICE
CERTIFICATE OF CORRECTION

PATENT NO. : 3,871,833
DATED : March 18, 1975
INVENTOR(S) : Jerome S. Spevack

It is certified that error appears in the above-identified patent and that said Letters Patent are hereby corrected as shown below:

(A) In the data and Abstract page: (1) for Col. 1, lines 4-5 thereof, read
"[75] Inventor: Jerome S. Spevack, 160 W. Pinebrook Drive, New Rochelle,
N. Y. 10804
[73] Assignee: Deuterium Corporation, 3 Corporate Park Drive, White Plains,
N. Y. (assignee of undivided interest)"
(2) In Col. 2, line 8 thereof, for "carried material in solution" read "carried material".

(B) In the text: (3) Col. 3, line 31, for "comprises" read "comprises (referring e.g., to Figs. 1a-1b)"; line 49, for the period read a comma; (4) Col. 4, line 32, for "(H_2S" read "H_2S"; line 59, for "pass" read "passes"; (5) Col. 5, line 9, for "are" read "is"; line 30, for "food" read "feed"; (6) Col. 6, line 8, for "comprises" read "comprises (referring e.g., to Figs. 1a-1b)"; line 9, for "side of" read "element"; line 15, for the semi-colon read a comma; (7) Col. 8, line 13, for "a supply" read "supplies"; line 14, for "way" read "ways"; line 38, for "1a)" read "1a;"; (8) Col. 9, line 1, for "portion 314a" read "portion 314c"; (9) Col. 10, line 48, for "thee" read "the".

(C) In the claims: (10) Claims 1, 2, 5, 6, 7, 8, 9, and 10, for the letters identifying the clauses "a.", "b.", etc., read "(a)", "(b)", etc.

Signed and Sealed this first Day of June 1976

[SEAL]

Attest:

RUTH C. MASON
Attesting Officer

C. MARSHALL DANN
Commissioner of Patents and Trademarks

Disclaimer

3,871,833.—*Jerome S. Spevack*, New Rochelle, N.Y. MEANS FOR IMPROVING THERMAL CONTROL IN DUAL TEMPERATURE SYSTEMS. Patent dated Mar. 18, 1975. Disclaimer filed May 29, 1980, by the assignee, *Deuterium Corporation*.

Hereby enters this disclaimer to claims 8 and 9 of said patent.

[*Official Gazette July 29, 1980.*]